Dec. 5, 1933.  J. M. NALLE  1,938,084
SHOCK ABSORBER
Filed Jan. 21, 1929   3 Sheets-Sheet 1
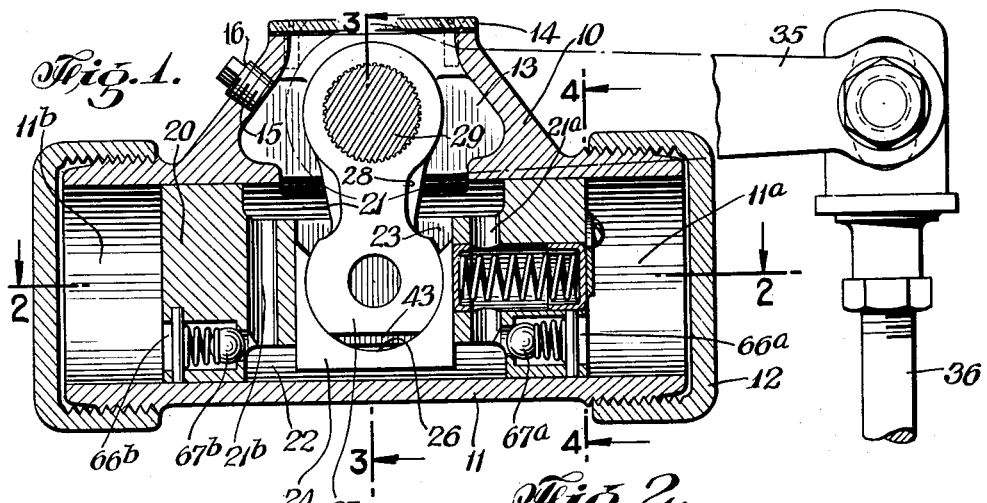
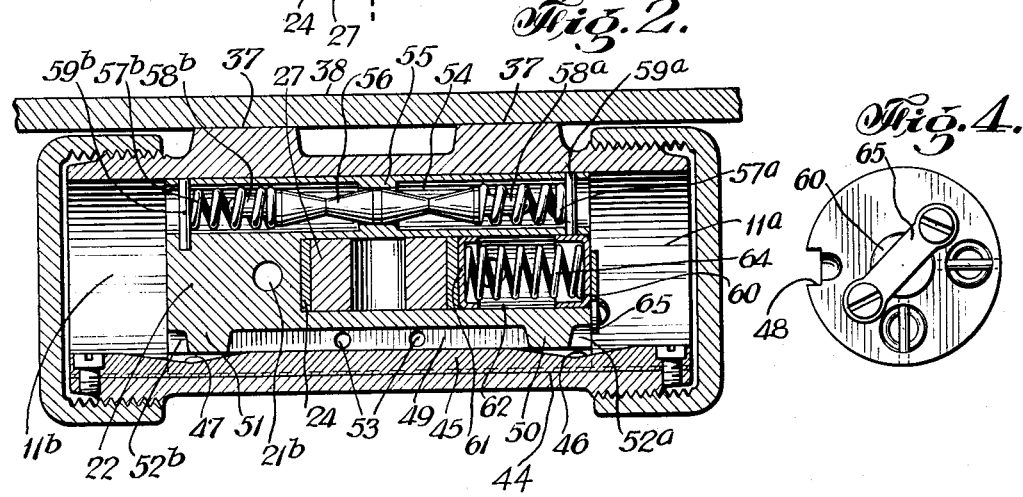
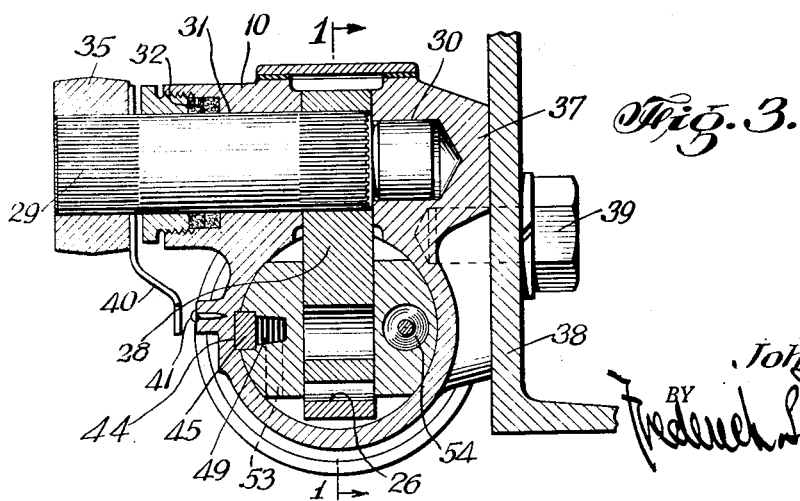
INVENTOR.
John M. Nalle
BY Frederick L. Daneau
ATTORNEY Dec. 5, 1933.   J. M. NALLE   1,938,084
SHOCK ABSORBER
Filed Jan. 21, 1929   3 Sheets-Sheet 2

INVENTOR.
John M. Nalle
BY
ATTORNEY

Dec. 5, 1933.   J. M. NALLE   1,938,084
SHOCK ABSORBER
Filed Jan. 21, 1929   3 Sheets-Sheet 3
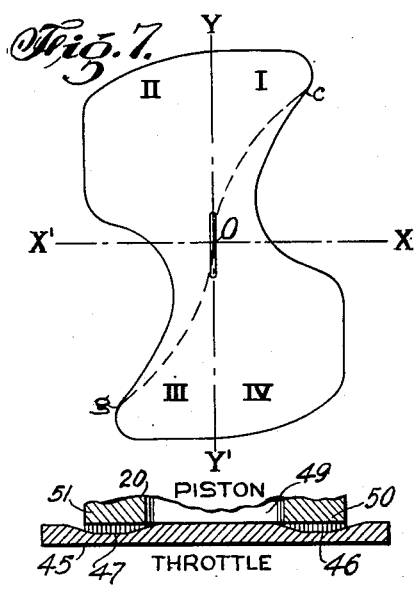
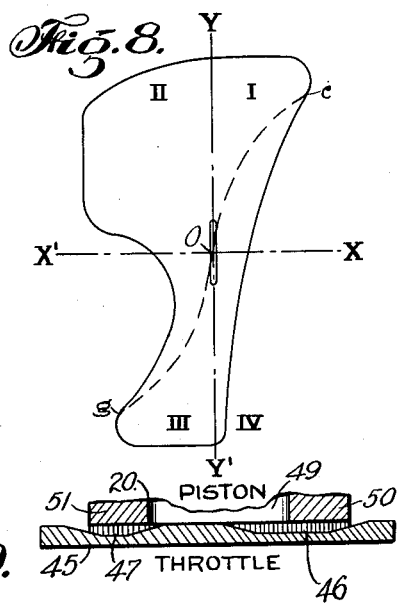
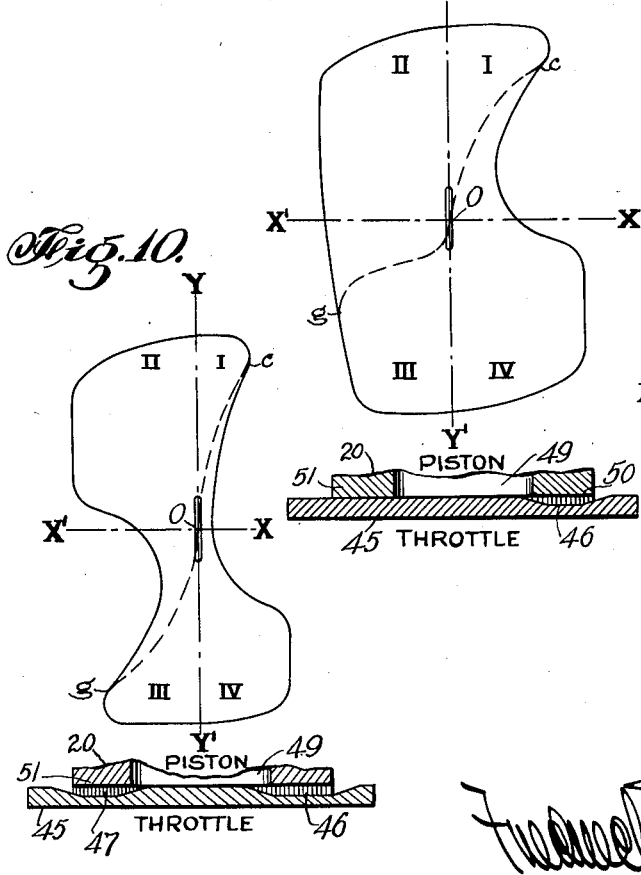
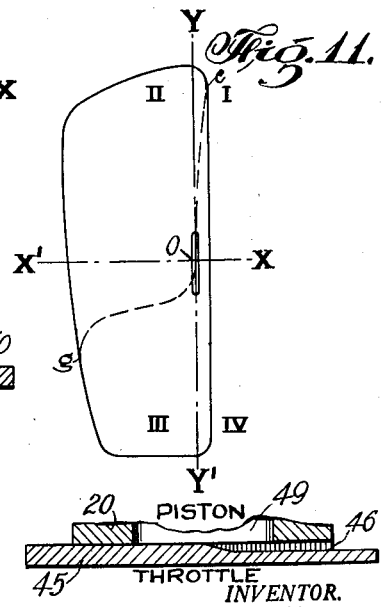
INVENTOR.
John M. Nalle
BY
ATTORNEY Patented Dec. 5, 1933

1,938,084

UNITED STATES PATENT OFFICE 1,938,084

SHOCK ABSORBER

John M. Nalle, Fairfield, Conn., assignor to American Chain Company, Inc., Bridgeport, Conn., a corporation of New York Application January 21, 1929. Serial No. 333,758

24 Claims. (Cl. 188—88)

My invention relates to improvements in shock absorbers for spring mounted vehicles. An object of my invention is to provide a shock absorber which will control the oscillations of a spring in its movements away from normal as well as toward normal.

Another object of my invention is to provide a shock absorber which will retard a spring at the end of its compression stroke to prevent the axle of the vehicle from sharply striking the vehicle frame.

Another object of my invention is to provide a shock absorber which will prevent excessive flexure of a vehicle spring in either direction away from normal.

Another object of my invention is to provide a shock absorber of the hydraulic type in which movements of a piston, or equivalent device, connected to a vehicle spring, are resisted by hydraulic friction.

Another object of the invention is to provide a hydraulic shock absorber of the type described above, having a channel for the escape of liquid from the working chamber and a throttle for graduating the size of the effective passage through the channel in pre-determined relation to the travel of the piston, or in other words, so that the size of the throttle opening will be determined by the instant position of the piston.

Another object of the invention is to provide a hydraulic shock absorber of the type described in the immediately preceding paragraph, with an independent channel for the escape of fluid from the working chamber and means for controlling the passage of fluid through said independent channel in predetermined proportion to the fluid pressure developed in said chamber.

Another object of the invention is to provide a hydraulic shock absorber having a flexible walled compression chamber to modify the pressure developed in said chamber.

Other objects of my invention will in some cases be readily apparent and in others be pointed out specifically in the following description of a preferred embodiment of my invention, while the novelty and scope of the invention will thereafter be pointed out in the claims.

In the accompanying drawings:

Figure 1 is a view in longitudinal section of my shock absorber, the section being taken on the line 1—1 of Fig. 3, part of the linkage for connecting the piston to an axle being shown in full;

Fig. 2 is a view, in longitudinal section taken on the line 2—2 of Fig. 1;

Fig. 3 is a view, in transverse section, showing the shock absorber attached to a portion of a vehicle frame, the section being taken on the line 3—3 of Fig. 1;

Fig. 4 is an end view of the piston, looking in the direction of the arrows 4—4 of Fig. 1;

Figs. 7 to 11 are diagrams illustrating pressure-travel curves obtainable with various throttles.

Figure 5:
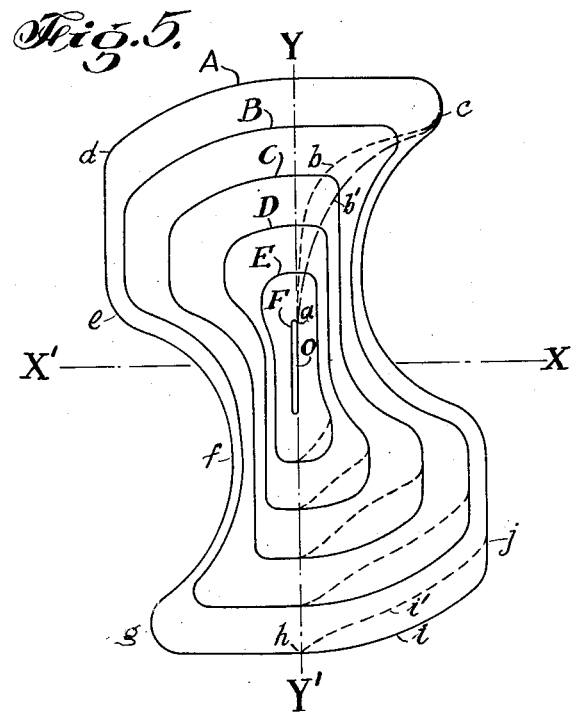
Fig. 5 is an indicator card illustrating typical resistance-travel curves obtained with my shock absorber at a certain setting thereof.
Figure 6:
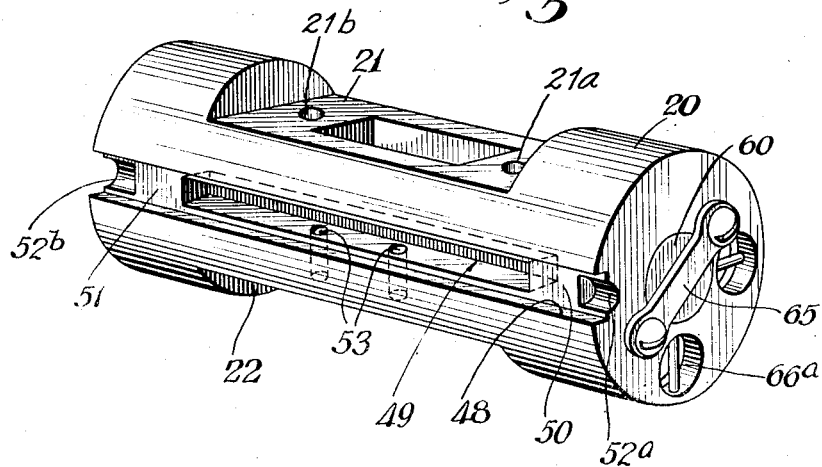
Fig. 6 is a view in perspective of the piston.

My shock absorber comprises a main body 10 provided with a hollow cylinder portion 11, the latter being closed at each end by means of caps 12 screwed thereon. Above this cylinder the body is formed with a chamber 13 which communicates with the bore of the cylinder and is closed at the top by means of a cover 14. The chamber 13 and the cylinder 11 are adapted to receive a quantity of oil or other suitable damping fluid which may be introduced therein through a port 15, the latter being normally closed by a screw plug 16.

Fitted within the cylinder 11 is a double ended piston 20 which divides the cylinder into two working chambers, 11a and 11b. The piston 20 is flattened at the top, intermediate its ends, to form a recess 21 communicating with the chamber 13, and a similar recess 22 is formed in the underside of the piston. Extending vertically through the piston from the recess 21 to the recess 22, is a slot 23 of rectangular form. This slot is adapted to receive a shoe 24 formed with an arcuate socket 26 running transversely therethrough of somewhat more than 180 degrees in extent. This socket is adapted to receive a cylindrical knob 27 formed on the end of a crank arm 28. The crank arm is secured to a shaft 29 which is journaled in bearings 30 and 31 in the body 10 and extends in a plane transverse to the cylinder 11.

As shown in Fig. 3 the shaft 29 projects from the side of the casing 10, and a stuffing box 32 of suitable form is provided to prevent leakage of oil through the bearing 31 and out of the body 10. The projecting end of the shaft 29 has, attached thereto, a crank arm 35, the outer end of which arm is connected by a ball and socket joint to a connecting rod 36. The shock absorber body 10 is provided with pads 37 adapted to be seated against a fixed part 38 of the vehicle frame, being held thereagainst by bolts 39 or other suitable means. The rod 36 is connected to the axle (not shown) of the vehicle, and since the axle is connected to the vehicle frame through a vehicle spring in the usual manner, compression and expansion of said spring will result in corresponding oscillation of the crank 28 and reciprocation of the piston 20.

As shown in Fig. 3 the shaft 29 has secured thereon an indicator arm 40, by which it is possible to determine whether the piston 20 is normally in central position in the cylinder 11. The crank arm 35 may be adjusted on the shaft 29 so that this desired central position is obtained. The arm 40 is notched at its lower end and a center pin 41 in the casing 10 serves to indicate by its position with respect to said notch when the piston is in central position.

As the crank arm 28 oscillates, the shoe 24 will move up and down within the slot 23, because the socket 26 has an angular extent of more than 180 degrees, causing the shoe 24 to cling to the knob 27 on the free end of the crank arm. In order to prevent trapping or pumping of oil due to the vertical movements of the shoe, ducts 21a and 21b are provided in the piston, running transversely therethrough and connecting the recess 21 to the recess 22. The lower end of the knob 27 is flattened, as indicated at 43, leaving a slight space for oil which serves to keep the knob and socket lubricated. In assembling the piston the shoe 24 is applied to the knob by sliding it transversely thereon, after which the crank 28 with the shoe connected thereto may be inserted in the slot 23.

As shown in Figs. 2 and 3 the cylinder 11 is formed with a seat 44 at one side to receive a throttle bar 45. The latter extends practically the full length of the cylinder and is secured to the seat 44 by means of screws, as shown. The outer face of the throttle bar is formed with shallow notches 46 and 47 respectively. The piston 20 is formed with a slot 48 to receive the throttle bar 45. This slot is deepened intermediate its ends to form a recess 49. The end walls 50 and 51 of the recess 49 are preferably reduced in thickness by cutting notches 52a and 52b respectively in the ends of the piston. These walls cooperate with the notches 46 and 47 respectively, to throttle the flow of liquid into and out of the working chambers. Communication is provided between the recess 49 and the recess 22 by way of openings 53, so that fluid entering the recess 49 from either working chamber may flow out into the body of oil stored in the supply chamber 13.

On the side opposite the slot 48 the piston is formed with a duct 54 running from end to end of the piston. This duct is centrally contracted to form an annular valve seat 55 in which a valve 56 is fitted to slide. The valve 56 is normally held in central position by opposed compression springs 57a and 57b. These springs fit upon stems 58a and 58b projecting from opposite ends of the valve 56. The springs bear at one end against the body of the valve and are secured to the piston at their opposite ends by means of pins 59a and 59b respectively. The body of valve 56 is conically tapered to a smaller diameter at each side of its central transverse plane so as to graduate the size of the opening formed as the valve moves off its seat in either direction. The duct 54 provides communication between the chamber 11a and the chamber 11b and the valve 56 will open to permit exchange of fluid between these chambers when the pressure in either one of them overbalances the pressure in the other to such an extent as to move the valve clear of the valve seat 55.

I also employ a cushioning device at one end of the piston, which comprises a spring-pressed cushion plunger 60. The plunger and an opposed plunger 61 are fitted to slide in a bore 62 formed in the piston. The bore extends from the right hand face of the piston, as shown in Figs. 1 and 2, to the slot 23 in which slides the shoe 24. The plungers 60 and 61 are preferably cup-shaped, with their concave faces inward to receive a compression spring 64. This spring presses the cushion plunger 60 against a strap 65 so that it lies flush with the end of the piston 20. At the same time the plunger 61 is pressed against the shoe 24 and serves to take up any slack between said shoe and the slot 23, thus overcoming any tendency for the shoe to knock as it reciprocates the piston. It will be observed from Fig. 1 that the bore 62 is traversed by the duct 21a, so that the oil in the shock absorber may enter the bore 62 and lubricate the plungers 61 and 60, and at the same time there will be no danger of trapping oil in the bore 62. The purpose of the cushion plunger will be explained hereinafter.

In order to keep the working chambers 11a and 11b filled with oil, refill ports 66a and 66b are provided which lead from the recess 22 into said chambers respectively. Each of these ports is furnished with a check valve opening towards the working chamber. The check valves are indicated in Fig. 1 at 67a and 67b respectively.

The operation of the shock absorber will now be explained. Hereinafter I shall use the term "compression stroke", when applied to the spring or axle, as denoting the whole upward movement of the spring or axle whether above, below, or through normal, while the term "expansion stroke" will denote the corresponding downward movement. This should not be confused with the compression produced by the piston which takes place in one chamber or the other on movement of said piston in either direction. The shock absorber as illustrated in Fig. 1 is shown in normal position with the piston centrally located in the cylinder. Starting from normal position, as the piston 20 moves toward the right it displaces oil from chamber 11a and at the same time causes the wall 50 to ride over the notch 46. At first the passage through said notch, under the wall, will widen, until the wall has been centered over the notch, after which it will gradually close as the outer edge of the wall approaches the outer inclined face of the notch. As the piston advances toward the right the fluid displaced from chamber 11a escapes under the wall 50 and thence through recess 49 and the ports 53 to the central chamber 13. When the wall 50 coacting with the notch 46 begins to throttle this escape, the pressure in the chamber 11a will build up at a rate which is determined by the slope of the forward inclined wall of the notch 46, and also by the action of the cushion plunger 60. The spring 64 is relatively light and consequently the cushion will yield and reach the limit of its depression before the pressure in the working chamber has mounted to a high value.

Before the passage under the wall 50 has been entirely closed off the pressure will be great enough to open the spring controlled valve 56, permitting fluid to flow out of the chamber 11a, through the duct 54, directly into the opposite working chamber 11b. The extent of opening in the duct 54 depends upon the strength of the springs 58a and 58b, and also upon the conical taper of the valve 56. Aside from affording control of the valve opening, the taper of the valve prevents chattering such as is liable to take place when an ordinary ball valve is used. If the movement of the piston is sufficient, the passage through the throttle notch 46 eventually will be entirely cut off and all the fluid in the chamber 11a displaced by the piston will then have to pass out through the duct 54.

While the piston 20 was moving toward the right, the notch 47 was at first gradually closed by the wall 51 and was entirely cut off by said wall before the wall 50 began to throttle the passage of fluid through the notch 46. Thus, while initially a certain amount of fluid was permitted to flow from the chamber 11a directly into the chamber 11b this was soon cut off, and the only way in which fluid could enter the chamber 11b was by way of the refill port 66b. Now, when the piston 20 starts to return toward the left, it will find its progress resisted by the fluid in the working chamber 11b. The only escape for this fluid, assuming that the wall 51 has moved beyond the notch 47, is by way of the duct 54, and as the springs controlling the valve 56 are set to resist opening of the valve until a predetermined high pressure is developed in the chamber 11b, a substantially greater initial resistance will be offered to the expansion stroke of the vehicle spring than was offered to its initial compression stroke. Not until the piston has moved far enough for the wall 51 to begin to uncover the notch 47 will this pressure be materially relieved and then the relief will be controlled by the shape of the inner inclined face of the notch 47. After the piston has returned to its normal central position and has begun to move past such position, the outer edge of the wall 51 will begin to throttle the passage from the chamber 11b to the recess 49 and pressure will again develop in the chamber 11b. On return of the piston toward the right a heavy pressure will be built up in the chamber 11a because the notch 46 will then be closed off by the wall 50. This pressure, however, will not be built up as rapidly as was the heavy pressure in chamber 11b, because of yielding of the cushion plunger 60.

The diagram Fig. 5 illustrates a series of typical resistance-travel curves which could be obtained with my shock absorber. In this diagram measurements parallel to the axis X—X' represent stresses developed in the connecting link and measurements parallel to the axis Y—Y' represent movements of the vehicle axle with respect to the body or vice versa. The normal central position of the piston is indicated at O. Movements of the piston toward the right are read upward on the diagram and movements toward the left, downward. Variations of pressure in the chamber 11a are indicated by the lines to the right of axis Y—Y' and pressures in the chamber 11b to the left of said axis. Thus, on an inital compression of a vehicle spring the line O—a—b—c indicates the variation of pressure in the chamber 11a with corresponding displacement of the piston. The pressure at first is practically negligible and then begins to rise at a as the notch 46 begins to be throttled. When this throttling becomes excessive the valve 56 begins to act. At about the point b the notch 46 is entirely closed and the only escape for the oil is by way of the valve 56. The line O—a—b'—c represents the pressure curve which would result were the piston not provided with the cushion plunger 60.

In the diagram I have shown a number of curves in full lines indicated by the reference letters A, B, C, D, E and F. Each of these is a typical resistance-travel curve obtained by a sustained oscillation of the spring through a predetermined range. Thus the curve A represents a cycle of pressures obtained by oscillating the spring through a maximum range. After the pressure has risen to a maximum in the chamber 11a the piston starts to move in the opposite direction and the pressure in said chamber drops rapidly to zero. At the same time pressure will be rapidly built up in the chamber 11b, reaching a maximum at a point d. This pressure will be maintained at a fairly consant value even past the point at which the notch 47 begins to open, because the velocity of the piston is a factor that must be considered. At the point e the escape through the notch 47 will be sufficient to cause a rapid drop of pressure in chamber 11b, which will continue even after the piston has moved well past the normal position indicated by the axis X—X'. At some point f the throttling of the notch 47b by the wall 51 will be sufficient to build up pressure again in the chamber 11b. Eventually the pressure will rise sufficiently to open the valve 56 against the spring 59a, the pressure curve reaching a maximum at g.

On the return stroke of the piston the pressure curve developed in the fourth quadrant Y'—O—X would be identical with that developed in the second quadrant Y—O—X', were it not for the cushion plunger. The full line h—i—j represents the pressure developed if no cushion is present and the broken line h—i'—j represents the modification caused by the cushion. However, the pressure curve in the first quadrant X—O—Y after the initial stroke would not be materially affected by the cushion, because there would be sufficient pressure throughout to keep the cushion plunger fully depressed. Hence, the curve in the first quadrant would be substantially identical with that in the third quadrant X'—O—Y'.

The shape of the resistance-travel curve will depend upon the amplitude of movement of the spring. Thus the smallest curve F is practically a straight line curve, with substantially no pressure on movement of the compression stroke of the spring but a slight pressure developed, on the expansion stroke. In other words, as the piston moves through a limited range toward the right in Fig. 2 there will be practically no throttling of the fluid by the throttle wall 50, but there will be a slight throttling on the return stroke while the inner edge of the wall 51 is uncovering the notch 47, and because of the velocity of the piston as it passes normal this pressure will continue until the spring has reached the end of its expansion stroke. The curve E differs considerably from the curve F because the movement of the piston is sufficient to bring considerable throttling action into play and the same is true of curves D and C. It will be observed that with the throttles as illustrated, a straight line pressure is provided on movements of the spring away from normal in either direction, in oscillations of magnitudes up to and including that of curve C. In the case of curves B and A, however, the velocity of the piston is such as to materially increase the pressure near the end of its stroke. This increased pressure retards the spring and prevents excessive flexure thereof.

It must be borne in mind that the diagram shows resistance-travel curves produced by sustained oscillations of the spring and that in actual practice the curves will spiral down to zero as the oscillation of the spring dies down.

The cushion plunger 61 plays an important part in taking care of sudden jolts produced when the vehicle wheels strike an abrupt obstruction at high speed. It is particularly valuable in taking care of jolts produced when the wheel drops into a hole and then is thrown suddenly upward as it strikes the far wall of the hole. Thus, assuming that the piston has dropped to the position $h$ in the diagram and then encounters the far wall of the hole, if no cushion were provided the pressure would mount suddenly in the chamber $11a$ imparting a severe jolt to the vehicle frame. With the cushion plunger present, however, the shock is eased off, and the pressure follows the curve $h$—$i'$—$j$.

The cushion plunger 60 may be placed at each end of the piston but preferably is provided only at that end which is under pressure during the compression stroke of the spring. It is on movements in this direction that the highest pressures may develop. The vehicle body moves up and down only at its natural periodicity and the axle moves downward under limited spring pressure with a harmonic motion due to the natural period of oscillation of the spring in conjunction with the weight of the wheels and axle, but the upward movement of the axle may take place at a much higher rate, depending upon the shape of the obstacle encountered and the speed of travel of the vehicle. In other words, there are known maximum fluid pressures to contend with, insofar as body movements are concerned, but some indefinite ones resulting from the upward axle movements, and by placing the cushion plunger in the right hand end of the piston, as shown in the drawings, abrupt variations of pressure on the compression stroke of the spring are taken care of. The cushion plunger could be placed in the cylinder wall instead of in the piston, if desired.

It will be clear from the foregoing description that I have devised a shock absorber in which retarding resistances are provided in each quadrant of a four quadrant pressure cycle. The escape of oil from the working chamber is determined by position-controlled throttle means and also by pressure-controlled throttle means, the operation of one of these means overlaps the operation of the other on movements of considerable magnitude. The position-controlled throttling means may be varied by varying the location, size and inclination of the notches in the throttle bar, while the pressure-controlled throttling means may be varied by changing the shape of the valve 56 and the strength of the springs $58a$ and $58b$. The resistance-travel curve may be further modified by varying the diameter of the cushion plunger and the strength of the spring 64.

In Figs. 7 to 11 inclusive, I have shown various pressure-travel curves, illustrating with each curve the form of throttle with which the curve may be obtained. The curve shown in Fig. 7 is similar to curve A in Fig. 5. That portion of curve which lies in quadrant I is like the portion in quadrant III and similarly the curves in quadrants II and IV are alike. The initial compression curve is indicated by the broken line O—$c$ and the initial expansion curve by the line O—$g$. This effect is produced with a throttle of such form that the piston walls 50 and 51 are positioned alike over the notches 46 and 47 when the piston is in normal position.

In Fig. 8 the notch 46 is greatly extended and reaches practically to the center of the recess 49 when the piston is in normal position. As a result of this setting there is little pressure in quadrant IV, but the pressure in quadrant I rises to practically the same amount as in quadrant I of Fig. 7. The curves in quadrants II and III of Fig. 8 are substantially the same as those in the corresponding quadrant of Fig. 7.

In Fig. 9 the notch 47 is eliminated and the throttle is provided with only a single notch 46 of the same shape as that in Fig. 7. This results in a curve in which the pressure on the expansion stroke is maintained almost constant through quadrants II and III while the curves in quadrants I and IV are similar in general form to those in the corresponding quadrants of Fig. 7. The initial expansion stroke indicated by the line O—$g$ differs materially from those in the previous diagrams.

Fig. 10 illustrates a still further modification caused by extending the notch 46 to the left and right. The resultant curve is somewhat like that of Fig. 7 except that the pressure in the first quadrant does not reach so high a value and the pressure in quadrant IV is relieved sooner. Fig. 11 illustrates the result of eliminating notch 47 and cutting away the throttle on the right hand side, so that notch 46 has no confining outer wall but is in the form of a step. This results in a straight line curve of low pressure on the compression stroke with a comparatively heavy compression approximating a straight line curve on the expansion stroke. The initial expansion stroke O—$g$ is similar to that in Fig. 9.

The curves given above are used to illustrate the variety of pressure controls obtainable with my improved shock absorber and also to show that the pressure characteristics in each quadrant may be controlled independently of the characteristics in any other quadrant. By my improved position-controlled throttle, I control not only the rate at which resistance is applied to the displacement of fluid from the working chambers in each quadrant, but also the amount of resistance in the quadrant, thus determining the amount of energy absorbed by each quadrant in the cycle.

It will be understood of course that the curves shown in Figs. 7 to 11 are formed by continuous oscillations of the vehicle spring and that in practice these curves would spiral down to zero as the oscillations of the spring were damped.

In all the diagrams Figs. 7 to 11, the action of the cushion plunger is eliminated. Obviously these curves would all be modified by the presence of a cushion plunger.

While I have described a preferred embodiment of my invention I do not wish to be limited to the specific structure here illustrated, but I consider myself at liberty to make such changes and variations in form, construction and arrangements of the parts as may be found desirable and as are included within the spirit and scope of my invention, as pointed out in the following claims.

1. In a hydraulic shock absorber, a cylinder, a piston reciprocable therein, the cylinder and piston cooperating to form a working chamber, means permitting restricted flow of liquid into and out of said chamber, a plunger in the working face of the piston, said plunger being adapted to yield to pressure developed in the chamber but without permitting the passage of liquid, and a spring, resisting yielding of said plunger.

2. In a hydraulic shock absorber, a cylinder, a piston reciprocable therein, the cylinder and piston cooperating to form a working chamber, means permitting restricted flow of liquid into and out of said chamber in response to reciprocation of the piston therein, the piston being formed with resiliently flexible means adapted to yield to a predetermined pressure in the chamber but without permitting the passage of liquid.

3. In a hydraulic shock absorber, a cylinder, a piston reciprocable therein, the cylinder and piston cooperating to form a working chamber, means permitting restricted flow of liquid into and out of said chamber in response to reciprocation of the piston therein, the piston being formed with a spring pressed liquid tight section adapted to yield to a predetermined pressure in the chamber.

4. In a hydraulic shock absorber, a liquid container, a member movable therein and cooperating therewith to form a working chamber, said chamber being provided with a resiliently flexible wall section, a valve controlled by successive instantaneous positions of said member in the chamber, and another valve controlled by hydraulic pressure developed in said chamber, said valves controlling the passage of liquid into and out of the working chamber.

5. In a hydraulic shock absorber, a liquid container, a member movable therein and cooperating therewith to form a working chamber, a valve controlled by successive instantaneous positions of said member, another valve controlled by the hydraulic pressure developed in said chamber, said valve serving to control the passage of liquid into and out of the working chamber as the latter is expanded and contracted by movements of said member, a plunger communicating with said chamber and adapted to be displaced by hydraulic pressure developed in the chamber, and a spring resisting displacement of said plunger.

6. In a hydraulic shock absorber, a liquid container, a member movable therein and dividing the container into a pair of working chambers and a supply chamber, means controlled by differential pressure in said working chambers for permitting restricted interchange of fluid from each working chamber directly into the other, and means controlled by successive instantaneous positions of said movable member for permitting restricted exchange of liquid between the working chambers and the supply chamber.

7. In a hydraulic shock absorber, a liquid container, a member movable therein and dividing the container into a pair of working chambers and a supply chamber, means controlled by differential pressure in said working chambers for permitting restricted interchange of fluid from each working chamber directly into the other, means controlled by the position of said movable member for permitting restricted discharge of liquid from each working chamber into the supply chamber, and a check valve opening into each working chamber from the supply chamber.

8. In a hydraulic shock absorber, a cylinder, a piston reciprocable therein and dividing the cylinder into a pair of opposed working chambers and an intermediate supply chamber, the piston being formed with a duct therethrough to provide communication between the two working chambers, the duct having a valve seat therein, a valve slidable in the seat, opposed springs holding the valve in balanced position in the seat and adapted to yield in response to predetermined differential pressures in the working chambers to open the valve and permit exchange of fluid between said chambers, and a valve controlled by movement of the piston for establishing restricted communication between each working chamber and the central chamber.

9. In a hydraulic shock absorber, a cylinder, a piston reciprocable therein and dividing the cylinder into a pair of opposed working chambers and an intermediate supply chamber, the piston being formed with a duct therethrough to provide communication between the two working chambers, a balanced valve in the duct, opposed springs holding the valve in balanced position and adapted to yield in response to a predetermined excess of pressure in either of the working chambers to permit of interchange of fluid between said chambers, and a check valve leading from the supply chamber into each of the working chambers.

10. In a hydraulic shock absorber, a cylinder member, and a piston member reciprocable therein and dividing the cylinder member into a pair of working chambers and an intermediate supply chamber, one of said members being formed with a central recess communicating with the supply chamber, the other member being formed with a pair of recesses adapted respectively to provide communication between the working chambers and the central recess when the piston is in normal position, certain of the walls of said recesses being inclined so as to graduate said communication, on movement of the piston, in predetermined proportion to the successive instantaneous positions of the piston.

11. In a hydraulic shock absorber, a cylinder member, and a piston member reciprocable therein and dividing the cylinder member into a pair of working chambers and an intermediate supply chamber, one of said members being formed with a central recess communicating with the supply chamber, and the other member being formed with a pair of V-shaped notches adapted respectively to provide communication between the working chambers and the central recess when the piston is in normal position.

12. In a hydraulic shock absorber, a cylinder, and a piston reciprocable therein and dividing the cylinder into a pair of working chambers and an intermediate supply chamber, the piston having a recess therein communicating with the supply chamber and separated by end walls from the working chambers, the cylinder being formed with V-shaped notches by-passing said end walls when the piston is in normal position.

13. In a hydraulic shock absorber, a cylinder, and a piston reciprocable therein and dividing the cylinder into a pair of working chambers and an intermediate supply chamber, the piston having a recess therein communicating with the supply chamber and separated by end walls from the working chambers, the cylinder being formed with notches by-passing said end walls when the piston is in normal position, certain of the defining surfaces of the notches being inclined so as to graduate the by-pass between the working chambers and the recess as the piston moves toward and from normal position.

14. In a hydraulic shock absorber, a cylinder providing a pair of opposed working chambers and an intermediate supply chamber, a piston reciprocable in the cylinder and separating each working chamber from the supply chamber, the piston being formed with a groove running longitudinally thereof, and a throttle bar secured to the cylinder and engaging said groove, the groove being formed with a recess communicating with the central chamber and the throttle bar being formed with depressions cooperating with the end walls of the recess to control communication between the working chambers and the supply chamber.

15. In a hydraulic shock absorber, a cylinder, a piston reciprocable therein, the piston being formed with a slot running transversely therethrough, a shoe in the slot reciprocable transversely with respect to the axis of the piston, and a crank having pivotal connection with the shoe and adapted by oscillation thereof to cause reciprocation of the piston in the cylinder.

16. In a hydraulic shock absorber, a cylinder, a piston reciprocable therein, the piston being formed with a slot running transversely therethrough, a shoe in the slot reciprocable transversely with respect to the axis of the piston, a crank having pivotal connection with the shoe and adapted by oscillation thereof to cause reciprocation of the piston in the cylinder, and a spring pressed plunger in the piston bearing against the shoe to take up slack between the shoe and said slot.

17. In a hydraulic shock absorber, a cylinder, a piston reciprocable therein, the piston being formed with a slot running transversely therethrough, a shoe in the slot reciprocable transversely with respect to the axis of the piston, a crank having pivotal connection with the shoe and adapted by oscillation thereof to cause reciprocation of the piston in the cylinder, the piston being formed with a bore extending from one end of the piston to the slot, a pair of plungers in said bore, a strap secured to the end of the piston across said bore, and a spring fitted between the plungers and adapted to hold one plunger against the strap and the other against the shoe.

18. In a hydraulic shock absorber, a cylinder providing a pair of opposed working chambers and an intermediate supply chamber, a piston reciprocable in the cylinder and separating the working chambers from the central chamber, the piston being formed with a duct extending therethrough to provide communication between the working chambers, the bore being restricted at one point to form a valve seat, a valve slidable in said seat, and opposed springs bearing respectively on opposite ends of the valve and serving to hold the valve normally in its seat, the valve being formed with extensions of predetermined form for controlling the size of valve opening in predetermined relation to the extent of movement of the valve in either direction off its seat.

19. In a hydraulic shock absorber, a liquid container, a piston dividing the container into a pair of working chambers, means for reciprocating the piston to cause displacement of liquid from said chambers, and means for variably resisting such displacement, the latter means comprising a separate control of the rate of application of such resistance on movement of the piston into one chamber as distinguished from the other and on movement of the piston toward, as against movement from normal position.

20. In a hydraulic shock absorber, a liquid container, a piston dividing the container into a pair of working chambers, means for reciprocating the piston to cause displacement of liquid from said chambers, and means for variably resisting such displacement, the latter means including separate control of the amount of such resistance on movement of the piston into one chamber as distinguished from the other and on movement of the piston toward, as against movement from normal position.

21. In a hydraulic shock absorber, a liquid container, a piston dividing the container into a pair of working chambers, means for reciprocating the piston to cause displacement of liquid from said chambers, and means for variably resisting such displacement, the latter means including separate control of the amount and rate of application of such resistance on movement of the piston into one chamber as distinguished from the other and on movement of the piston toward, as against movement from normal position.

22. A shock absorber comprising in combination, a casing presenting a cylinder; a piston in said cylinder; a lever for operating said piston, said lever being rotatably supported by the casing and having a rounded, free end; and a saddle for said lever, said saddle comprising opposite branches the adjacent sides of which are rounded to fit the rounded end of the lever, the outer, or more remote surfaces of said branches being substantially parallel and flat for engaging cooperating walls in the piston.

23. A shock absorber comprising, in combination, a casing presenting a cylinder; a piston in said cylinder, having a recess intermediate its ends, providing two substantially parallel walls; a lever for operating said piston, journalled in the casing, the free end of the lever having a circular, outer edge; and a saddle carried by the lever, said saddle having spaced branches the inner surfaces of which are concaved to fit upon the circular, outer edge of the lever, the outer surfaces of said branches being substantially flat and parallel for engagement with the parallel walls of the piston.

24. A shock absorber comprising, in combination, a casing presenting a cylinder; a piston in said cylinder, having a recess intermediate its ends, providing two substantially parallel walls; a lever for operating said piston, journalled in the casing, the free end of the lever having a circular, outer edge; and a saddle pivotally carried by the lever, said saddle having spaced branches the inner surfaces of which are concaved to fit upon the circular, outer edge of the lever, the outer surfaces of said branches being substantially flat and parallel for engagement with the parallel walls of the piston.

JOHN M. NALLE.